(12) United States Patent
Hottebart

(10) Patent No.: US 8,763,663 B2
(45) Date of Patent: Jul. 1, 2014

(54) RUN-FLAT TIRE HAVING AN ADDITIONAL SIDEWALL REINFORCEMENT

(75) Inventor: Francois Hottebart, Royat (FR)

(73) Assignees: Compagnie Generale des Etablissements Michelin, Clermont-Ferrand (FR); Michelin Recherche et Technique S.A., Granges-Paccot (FR)

( * ) Notice: Subject to any disclaimer, the term of this patent is extended or adjusted under 35 U.S.C. 154(b) by 765 days.

(21) Appl. No.: 12/918,989

(22) PCT Filed: Feb. 18, 2009

(86) PCT No.: PCT/EP2009/051917
§ 371 (c)(1),
(2), (4) Date: Nov. 24, 2010

(87) PCT Pub. No.: WO2009/103733
PCT Pub. Date: Aug. 27, 2009

(65) Prior Publication Data
US 2011/0056605 A1    Mar. 10, 2011

Related U.S. Application Data

(60) Provisional application No. 61/126,442, filed on May 5, 2008.

(30) Foreign Application Priority Data

Feb. 21, 2008    (FR) ...................................... 08 51124

(51) Int. Cl.
*B60C 13/00* (2006.01)
*B60C 17/00* (2006.01)

(52) U.S. Cl.
USPC .......................... 152/517; 152/550; 152/555

(58) Field of Classification Search
USPC ......................................... 152/517, 555, 550
See application file for complete search history.

(56) References Cited

U.S. PATENT DOCUMENTS

| | | | |
|---|---|---|---|
| 4,436,130 A | * | 3/1984 | Suzuki et al. ................. 152/525 |
| 5,427,166 A | | 6/1995 | Willard, Jr. |

(Continued)

FOREIGN PATENT DOCUMENTS

| | | | |
|---|---|---|---|
| JP | 58-116205 | * | 7/1983 |
| JP | 5-286319 | * | 11/1993 |

(Continued)

OTHER PUBLICATIONS

English machine translation of JP5-286319, dated Nov. 1993.*

*Primary Examiner* — Justin Fischer
*Assistant Examiner* — Robert Dye
(74) *Attorney, Agent, or Firm* — Cozen O'Connor

(57) ABSTRACT

A run-flat tire (11) comprising a crown comprising a crown reinforcement (21, 22) surmounted by a tread (30); two sidewalls (40) extending the crown radially inward; two beads (50) radially inward to the sidewalls and each comprising an annular reinforcing structure (60); at least one carcass reinforcement (71, 72) anchored in each of the beads and extending from the beads through the sidewalls toward the crown; and at least one sidewall insert (80) axially on the inside of the carcass reinforcement, comprising at least one polymer compound; wherein at least one sidewall of the tire further comprises: at least one additional sidewall reinforcement (90) comprising reinforcing elements, positioned axially on the outside of the carcass reinforcement, the radially inside end (91) of the additional sidewall reinforcement being, in any radial section, radially on the inside of the axial straight line (100) that passes through those points in the sidewalls at which the carcass reinforcement has its greatest axial width when the tire is mounted on a rim; and a layer (110) of polymer compound positioned between the additional sidewall reinforcement and the carcass reinforcement, over at least a portion of the additional sidewall reinforcement.

6 Claims, 5 Drawing Sheets

(56) References Cited

U.S. PATENT DOCUMENTS

| | | | |
|---|---|---|---|
| 5,511,599 A * | 4/1996 | Willard, Jr. | 152/454 |
| 5,795,416 A * | 8/1998 | Willard et al. | 152/517 |
| 6,609,550 B2 * | 8/2003 | Suzuki | 152/517 |
| 6,814,120 B1 | 11/2004 | Nguyen et al. | |
| 2005/0236085 A1 | 10/2005 | Markoff et al. | |
| 2009/0320984 A1 | 12/2009 | Maehara | |

FOREIGN PATENT DOCUMENTS

| | | | |
|---|---|---|---|
| JP | 07-215023 | | 8/1995 |
| JP | 2000 168319 | | 6/2000 |
| JP | 2007-8314 | * | 1/2007 |
| JP | 2007-253827 | | 10/2007 |
| JP | 2008-024093 | | 2/2008 |
| WO | WO 00/46047 | | 8/2000 |

* cited by examiner

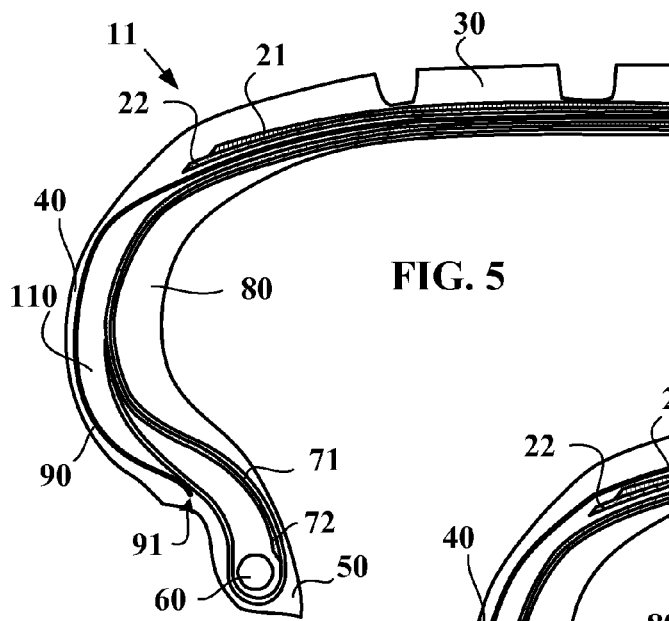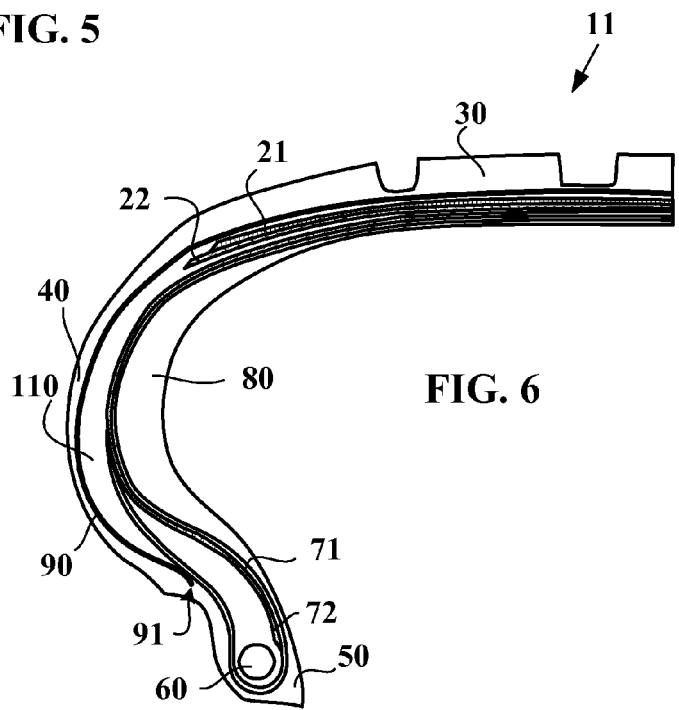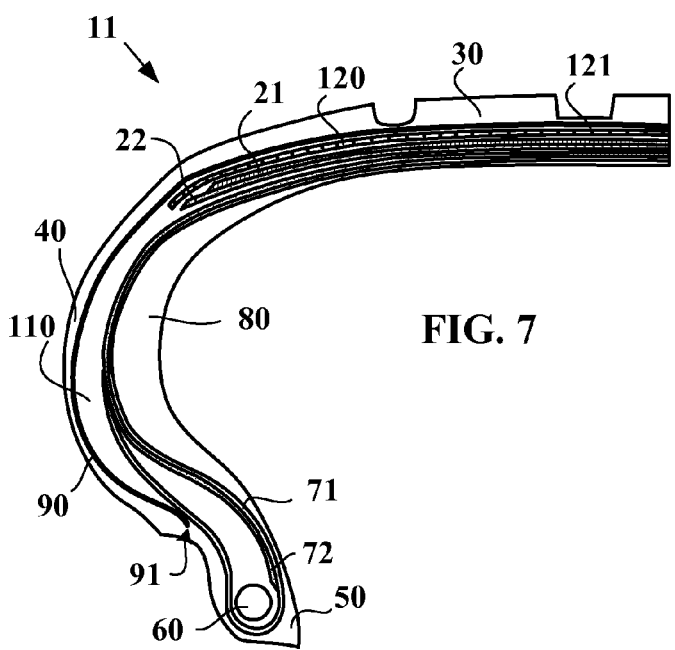

RUN-FLAT TIRE HAVING AN ADDITIONAL SIDEWALL REINFORCEMENT

RELATED APPLICATIONS

This is a U.S. national stage under 35 USC §371 of application No. PCT/EP2009/051917, filed on Feb. 18, 2009.

This application claims the priority of French application Ser. No. 08/51124 filed Feb. 21, 2008, and U.S. Provisional application Ser. No. 61/126,442 filed May 5, 2008, the entire content of both of which is hereby incorporated by reference.

FIELD OF THE INVENTION

The present invention relates to run-flat tires provided with self-supporting sidewalls.

BACKGROUND OF THE INVENTION

For a number of years, tire manufacturers have been devoting significant effort to developing novel solutions to a problem that dates back to the very start of the use of wheels fitted with tires of the inflated type, i.e. how to allow the vehicle to continue on its journey in spite of a substantial or complete loss of pressure from one or more tires. For decades, the spare wheel was considered to be the only and universal solution.

Then, more recently, the considerable advantages associated with omitting the spare wheel appeared. The idea of "extended mobility" was developed. The associated techniques allow a vehicle to continue to drive along without removing the tire, even after a puncture or significant loss of pressure, provided that certain instructions are observed. This for example means that a repair facility can be reached without the need to stop, under circumstances that are often dangerous, in order to fit the spare wheel.

Today, there are two major types of run-flat technology. On the one hand, there are wheels equipped with supports, capable of supporting the inside of the tread of a tire when the sidewalls collapse following a drop in pressure. This solution is advantageously combined with a tire comprising a bottom region capable of minimizing the risks of the tire slipping off the rim. This solution has the advantage that the tire performance under normal conditions is very close to the performance of a conventional tire. By contrast, it does have the disadvantage of entailing the use of an additional component, namely the support, for each of the wheels of the vehicle.

On the other hand, there are tires of the self-supporting type (often known by their English-language acronym "ZP" which stands for "zero pressure"). These self-supporting tires are capable of bearing a significant load at a reduced pressure, or even without pressure, because they have sidewalls which are reinforced, usually by means of rubber inserts provided in the sidewalls. For the sake of simplicity, these tires will hereinafter be referred to as "run-flat tires".

Tires such as this are known, for example, from U.S. Pat. No. 4,067,347, U.S. Pat. No. 4,779,658, U.S. Pat. No. 5,511,599, U.S. Pat. No. 5,769,980, U.S. Pat. No. 5,795,416, U.S. Pat. No. 6,022,434 and U.S. Pat. No. 7,093,633.

While these tires offer satisfactory service under run-flat conditions, they have the disadvantage, under normal running (that is to say when inflated to their service pressure or pressure close to this service pressure), of having inferior performance compared to conventional tires, particularly as regards ride comfort and rolling resistance. The drop in comfort can be explained by the fact that the additional rigidity afforded by the reinforced sidewalls penalizes the rolling flexibility of the tire, making driving unpleasant. The increased rolling resistance, for its part, stems from the addition of material to the sidewalls; these materials, because of their deformation and hysteretic losses, contribute to increasing the resistance of the tire to rolling.

SUMMARY OF THE INVENTION

One of the objectives of the invention is to resolve these problems by providing a run-flat tire of the self-supporting type that allows an improvement in ride comfort and reduces the rolling resistance while at the same time offering the same run-flat performance as known run-flat tires.

This objective is achieved in accordance with one aspect of the present invention directed to a run-flat tire comprising:
  a crown comprising a crown reinforcement surmounted by a tread;
  two sidewalls extending the crown radially inward;
  two beads radially inward to the sidewalls and each comprising an annular reinforcing structure;
  at least one carcass reinforcement anchored in each of the beads and extending from the beads through the sidewalls toward the crown; and
  at least one sidewall insert axially on the inside of the carcass reinforcement, intended to reinforce the sidewall, comprising at least one polymer compound, each sidewall insert being capable of withstanding a load corresponding to part of the weight of the vehicle in a situation in which the inflation pressure is substantially reduced or zero.

A tire according to an embodiment of the invention further comprises:
  at least one additional sidewall reinforcement comprising reinforcing elements, positioned axially on the outside of the carcass reinforcement, the radially inside end of the additional sidewall reinforcement being, in any radial section, radially on the inside of the axial straight line that passes through those points in the sidewalls at which the carcass reinforcement has its greatest axial width when the tire is mounted on a rim; and
  a layer of polymer compound positioned between the additional sidewall reinforcement and the carcass reinforcement, over at least a portion of the additional sidewall reinforcement.

This structure makes it possible to improve the performance of the tire under normal running conditions while at the same time maintaining its run-flat performance.

This improvement can be understood as follows. When the tire is inflated to its service pressure, the additional sidewall reinforcement is stretched little if at all because, in particular, of its being positioned axially on the outside of the carcass reinforcement which absorbs most of the tension generated by the inflation pressure. This reduced tension means that the rubber that lies between the carcass reinforcement and the additional sidewall reinforcement is subjected to little or no compressive stress when the tire is laden and therefore makes little contribution if any to the rigidity of the tire.

The performance of the tire according to the invention under normal running conditions is, therefore, comparable with that of a tire that has no additional sidewall reinforcement and no layer of polymer compound.

However, under run-flat conditions, the additional sidewall reinforcement is tensioned particularly as a result of:
  the low or zero tension in the carcass reinforcement which is due to the absence of inflation pressure,
  the greater curvature of the sidewall of the tire and
  the additional sidewall reinforcement is positioned axially on the outside.

The additional sidewall reinforcement therefore contributes to the rigidity of the tire allowing two crescents of rubber, namely the sidewall insert, axially on the inside of the carcass reinforcement, and the crescent of rubber that lies between the carcass reinforcement and the additional sidewall reinforcement to be compressed. The performance of the tire according to the invention is, therefore, equivalent to that of a tire with a small sidewall insert thickness to which is added the layer of polymer compound positioned between the additional sidewall reinforcement and the carcass reinforcement. Through a suitable choice of materials and relative thicknesses of the sidewall insert and of the layer of polymer compound positioned between the additional sidewall reinforcement and the carcass reinforcement (this choice being within the competence of those skilled in the art) the run-flat performance of the tire according to the invention can be made equivalent to that of a reference tire. Due to the small thickness of the sidewall insert, the ride comfort and rolling resistance under normal running conditions are improved.

According to an advantageous embodiment, the at least one additional sidewall reinforcement comprises radial reinforcing elements. Alternatively, the additional sidewall reinforcement could comprise reinforcing elements that make an angle of less than 65° with the circumferential direction. The reinforcing elements can be arranged in one or several layers. If several layers are provided, the reinforcing elements of adjacent layers may be crossed with respect to each other.

According to an advantageous embodiment, the additional sidewall reinforcement extends from one sidewall to the other. This embodiment has the advantage of great simplicity of implementation. As a preference, the additional sidewall reinforcement is inserted, in the crown, between the carcass reinforcement and the crown reinforcement. Thus, it does not interfere with the operation of the crown reinforcement. It would be equally possible to run the additional sidewall reinforcement between two crown reinforcement elements or to lay it radially on the outside thereof. If the tire also comprises a hoop reinforcement formed of reinforcing elements directed circumferentially and wound into a spiral, this hoop reinforcement being positioned radially on the outside of the crown reinforcement, then provision may be made for the additional sidewall reinforcement to be inserted, in the crown, between the crown reinforcement and the hoop reinforcement. Alternatively, it may be advantageous to position the additional sidewall reinforcement in such a way that it extends, in the crown, radially on the outside of the hoop reinforcement.

According to a preferred embodiment, said at least one additional sidewall reinforcement consists of two separate portions, said portions being positioned in different sidewalls. The radially outside end of each additional reinforcement being axially on the outside of the adjacent axial end of the crown reinforcement. This makes it possible to reduce quantity, and, therefore, the total mass, of the additional sidewall reinforcement, the effect of this being to lighten the weight of the tire. In addition, the height of the additional sidewall reinforcement and the distance between it and the carcass reinforcement offer the tire designer degrees of design freedom.

If each side wall is provided with its own additional sidewall reinforcement, then it is preferable for the radial distance between the radially outside end of each additional sidewall reinforcement and the axial ends of the crown reinforcement to be greater than 6 mm. Thus, the ends of the crown reinforcement are far enough away from the ends of each additional sidewall reinforcement, thus making it possible to improve the robustness with respect to manufacturing tolerances and to prevent any deterioration of the endurance at the shoulder of the tire.

According to a preferred embodiment, the radial distance between the radially inside end of the additional sidewall reinforcement and the radially innermost point of the corresponding annular reinforcing structure (that is to say, the annular reinforcing structure situated on the same side of the tire) is greater than or equal to 20 mm. This then avoids introducing the radially inside end of the additional sidewall reinforcement into that region of the tire which is wedged between the annular reinforcing structure of the bead and the flange of the rim on which the tire is mounted. This is all the more important if the tire comprises a carcass reinforcement turned up around the annular reinforcing structure and in which the turn-up is also housed between the annular reinforcing structure and the rim flange. As the additional sidewall reinforcement does not enter this delicate region, the endurance of the bead concerned is improved.

According to an advantageous embodiment, the axial distance between at least one of the radial ends of the additional sidewall reinforcement and the carcass reinforcement is less than 2 mm. This embodiment has the advantage of in some way enclosing the layer of polymer compound between reinforcements, thus reducing its freedom to move under run-flat conditions when the additional sidewall reinforcement is tensioned. If the layer of polymer compound is incompressible, as is the case with the vast majority of unexpanded polymer materials, restricting its freedom to move has the effect of making the sidewall very rigid. If this phenomenon is to be even further enhanced, then it is advantageous for the axial distance between the two radial ends of the additional sidewall reinforcement and the carcass reinforcement to be less than 2 mm. (If the carcass reinforcement and the additional sidewall reinforcement are reinforced by threads, then this distance is measured from back of thread to back of thread).

It may be advantageous to keep the major portion of the additional sidewall reinforcement as far away as possible from the carcass reinforcement in order to avoid the additional sidewall reinforcement from becoming tensioned by absorbing inflation forces. This objective may, in particular, be achieved through the use of a thick polymer compound layer. As a matter of fact, the thickness of the rubber between the carcass reinforcement and the additional sidewall reinforcement plays its part in generating the run-flat rigidity and therefore makes it possible to reduce the thickness of the insert for a target run-flat rigidity. A careful choice of the thicknesses of the insert and of the layer of polymer compound makes it possible to fine-tune the compromise between low rigidity in the inflated state and high rigidity under run-flat conditions.

According to an advantageous embodiment, the maximum axial thickness of the layer of polymer compound positioned between the additional sidewall reinforcement and the carcass reinforcement is greater than or equal to 10% of the maximum axial thickness of the sidewall of the tire in the radial region over which the additional sidewall reinforcement extends. More generally, and irrespective of the size of the tire, it is preferable to ensure that the maximum axial thickness of the layer of polymer compound positioned between the additional sidewall reinforcement and the carcass reinforcement is greater than or equal to 2 mm.

Because the layer of polymer compound positioned between the additional sidewall reinforcement and the carcass reinforcement acts, under run-flat conditions, very much like a sidewall insert, it is preferable for the composition of the polymer compound positioned between the additional sidewall reinforcement and the carcass reinforcement to be identical to the composition of the polymer compound of the sidewall insert. This choice also makes it possible to reduce the number of polymer compounds used in the manufacture of the tire and, therefore, the cost of manufacture.

The reinforcing elements of the additional sidewall reinforcement may be metallic or textile (aramid, nylon, polyester, etc.). They may exhibit linear or almost-linear force/elongation curves or, on the contrary, may exhibit highly non-linear force/elongation curves. In the latter instance, preference may be given to the use of reinforcing elements that have low rigidity at low elongation (so as to minimize the rigidity when running under inflated conditions) and high rigidity at high elongation (in order to maximize the rigidity under run-flat conditions).

BRIEF DESCRIPTION OF THE DRAWINGS

FIGS. 2 to 7 depict, in radial section, part of a run-flat tire according to embodiments of the invention;

DETAILED DESCRIPTION OF THE DRAWINGS

Figure 1:
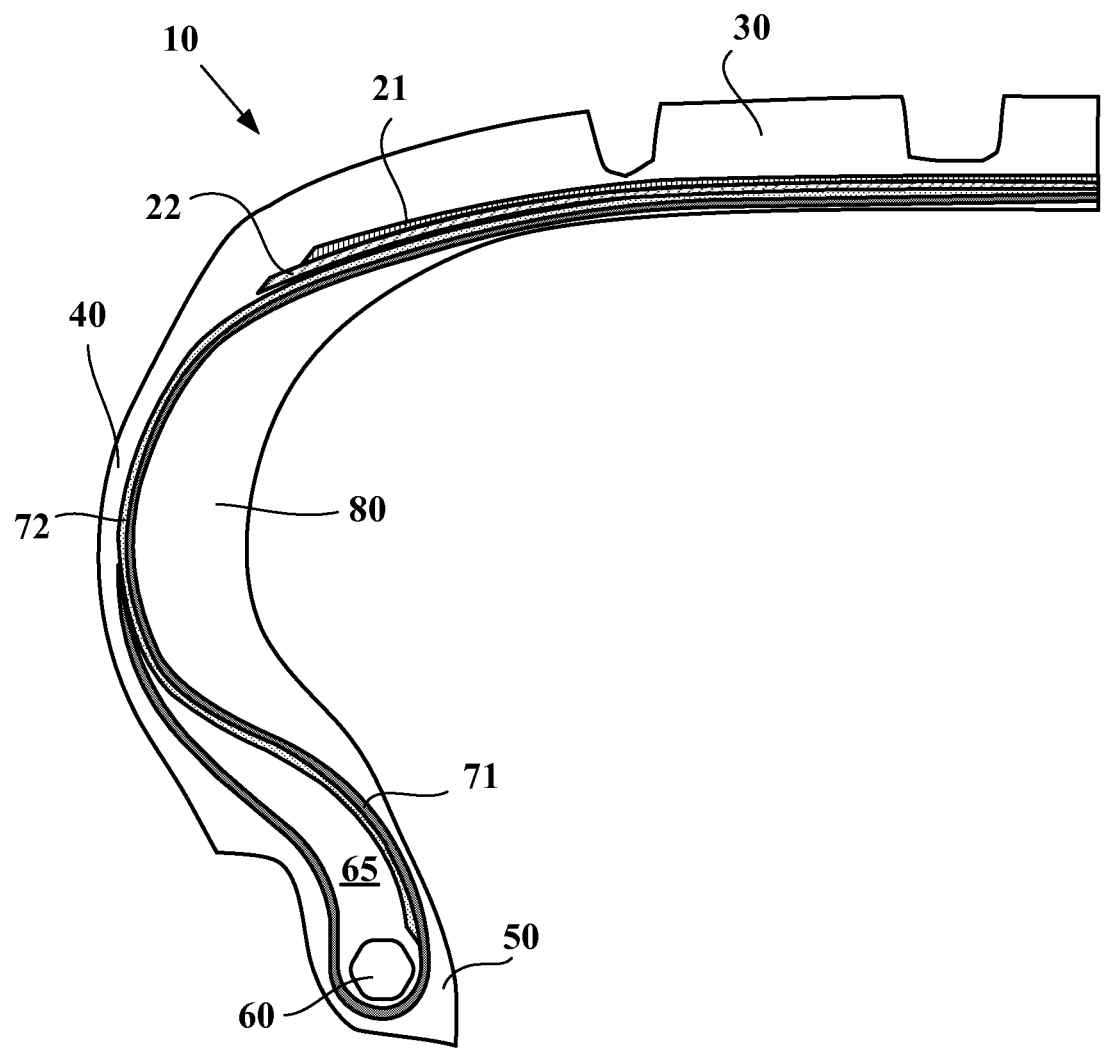
FIG. 1 depicts, in radial section, part of a run-flat tire according to the prior art.

In the context of this document, "run-flat mode" or "run-flat conditions" denotes a running mode in which the tire inflation pressure is significantly reduced by comparison with the service pressure, or even is at zero pressure, for example after a serious tire puncture. This running mode is sometimes also termed "running in degraded mode". By contrast, this text refers to "normal running mode" or "normal running conditions" when the tire is inflated to its service pressure.

It is appropriate in the use of the term "radial" to make a distinction between the various different ways in which those skilled in the art employ this word. Firstly, the expression refers to a radius of the tire. It is in this sense that a point A is said to be "radially on the inside of" a point B (or "radially inside" the point B) if it is closer to the axis of rotation of the tire than is point B. Conversely, a point C is said to be "radially on the outside of" a point D (or "radially outside" the point D) if it is further away from the axis of rotation of the tire than is point D. Progress toward smaller (or larger) radii will be termed progress "radially inward (or outward)". This meaning of the term also applies where radial distances are involved.

By contrast, a thread or a reinforcement is said to be "radial" when the thread or the reinforcing elements of the reinforcement make an angle greater than or equal to 65° and less than or equal to 90° with the circumferential direction. Let us specify that, in this document, the term "thread" is to be understood in its broadest possible sense and to include threads in the form of monofilaments, multifilaments, a cable, a yarn or an equivalent assembly, irrespective of the material of which the thread is made or of the surface treatment it may have received in order to increase its adhesion to the rubber.

Finally, a "radial section" or "radial cross section" must be understood here to mean a section or cross section on a plane containing the axis of rotation of the tire.

An "axial" direction is a direction parallel to the axis of rotation of the tire. A point E is said to be "axially on the inside of" a point F (or "axially inside" the point F) if it is closer to the mid plane of the tire than is point F. Conversely, a point G is said to be "axially on the outside of" a point J (or "axially outside" the point J) if it is further from the mid plane of the tire than is point J. The "mid plane" of the tire is the plane which is normal to the axis of rotation of the tire and which lies at equal distances from the annular reinforcing structures of each bead.

A "circumferential" direction is a direction which is perpendicular both to a radius of the tire and to the axial direction.

The "deflection" of a tire is to be understood to mean the difference between the radius of the tire in its unladen state and the vertical distance separating the axis of rotation of the tire in its laden state and the ground on which the tire is standing.

The term "insert" as used herein can refer to an element that is inserted into the tire after curing. This term is also used in a more general sense and can refer to an inner structural element of the tire, such as a rubber part of the tire which is integral with the tire and is cured together with the tire.

FIG. 1 depicts schematically, viewed in radial section, a run-flat tire 10 of the self-supporting type according to the prior art. This tire 10 comprises a crown, comprising a crown reinforcement formed of two layers of reinforcing elements 21 and 22 and surmounted by a tread 30. Two sidewalls 40 extend the crown radially inward. The tire 10 further comprises two beads 50 radially on the inside of the sidewalls and each comprising an annular reinforcing structure 60, in this instance a bead wire, and a carcass reinforcement comprising two layers of reinforcing elements 71 and 72, one of which is anchored into each of the beads by being turned up around the bead wire, the carcass reinforcement extending from the beads 50 through the sidewalls 40 toward the crown. Of course, the carcass reinforcement of a tire according to the invention does not necessarily have two layers of reinforcing elements. In particular, it may have just one layer of reinforcing elements. The tire 10 further comprises two sidewall inserts 80, axially on the inside of the carcass reinforcements 71 and 72. These inserts with their characteristic crescent-shaped radial section, are intended to strengthen the sidewall. They comprise at least one polymer compound, preferably a rubber compound. Document PCT/US01/17257, corresponding to WIPO publication no. WO 02/096677, the content of which is hereby incorporated by reference, provides numerous examples of rubber compounds that can be used to form such an insert. Each sidewall insert 80 is capable of supporting a load corresponding to a substantial part of the weight of the vehicle in a situation in which the inflation pressure is substantially reduced or zero.

Figure 2:
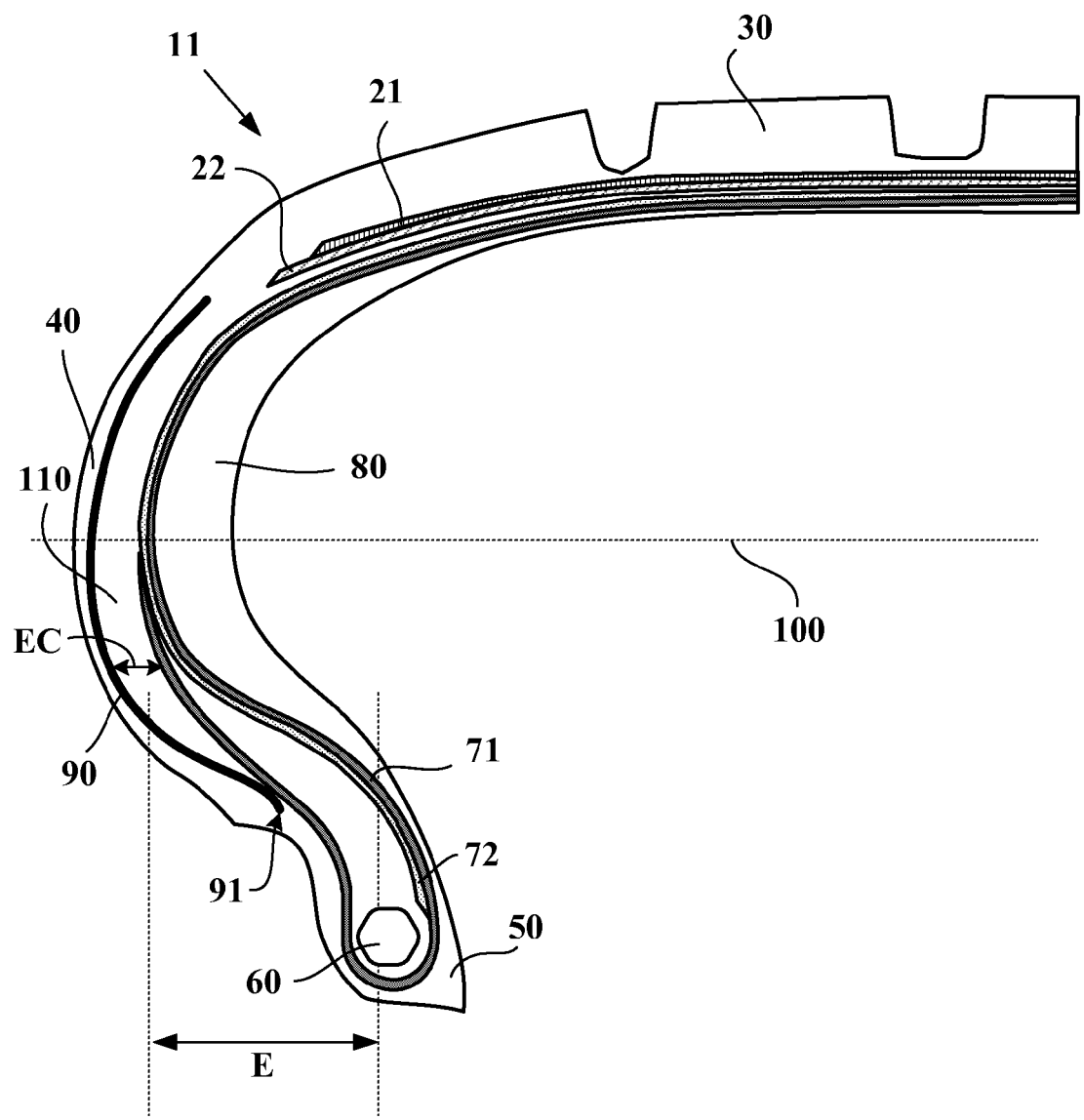

FIG. 2 depicts a tire 11 according to an embodiment of the invention which differs from the tire 10 of FIG. 1 particularly in that the sidewalls 40 further comprise an additional sidewall reinforcement comprising radial reinforcing elements, in this instance aramid threads, positioned axially on the outside of the carcass reinforcement formed by the layers of reinforcing elements 71 and 72. The radially inside end of the additional sidewall reinforcement 90 is, in any radial section, radially on the inside of the axial straight line 100 that passes through those points on the sidewalls at which the carcass reinforcement has its greatest axial width when the tire is mounted on a rim. The tire 11 further comprises a layer 110 of polymer compound positioned between the additional sidewall reinforcement 90 and the carcass reinforcement formed by the layers of reinforcing elements 71 and 72, over the entire radial height of the additional sidewall reinforcement 90.

The thickness of the sidewalls 40 of the tire 11 is substantially identical to that of the sidewalls of the tire 10 in spite of the addition of the additional sidewall reinforcement 90 and of the layer 110 of polymer compound. Indeed, the thickness of the inserts 80 has been reduced and it is precisely through having made this reduction that the improvement in performance under normal running conditions (improvement in ride comfort, reduction in rolling resistance) that are found in the tire according to this embodiment of the invention can be achieved.

Figure 8:
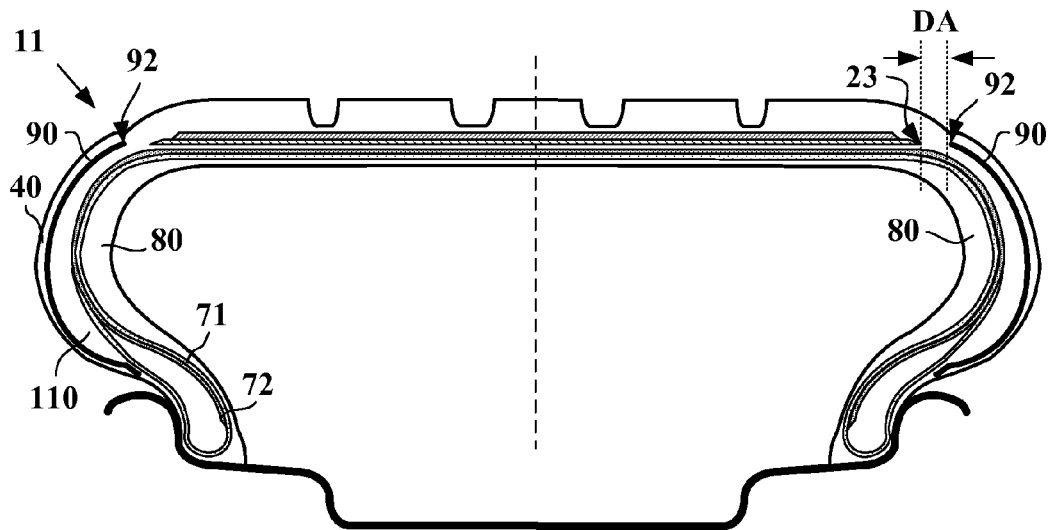
FIGS. 8 to 10 illustrate the behavior of a tire according to an embodiment of the invention under normal running conditions and under run-flat conditions.

As stated earlier, when the tire 11 is inflated to its service pressure ("normal running"), the additional sidewall reinforcement 90 absorbs little, if any, tension and plays little, if any, part in the rigidity of the tire, particularly as a result of (1) the tension in the carcass reinforcement formed by the layers of reinforcing elements 71 and 72 which is generated by the inflation pressure, (2) the small curvature of the sidewall 40 of the tire and (3) its position axially on the outside of the carcass reinforcement. FIG. 8 illustrates the geometry of the tire during this type of running.

Figure 9:
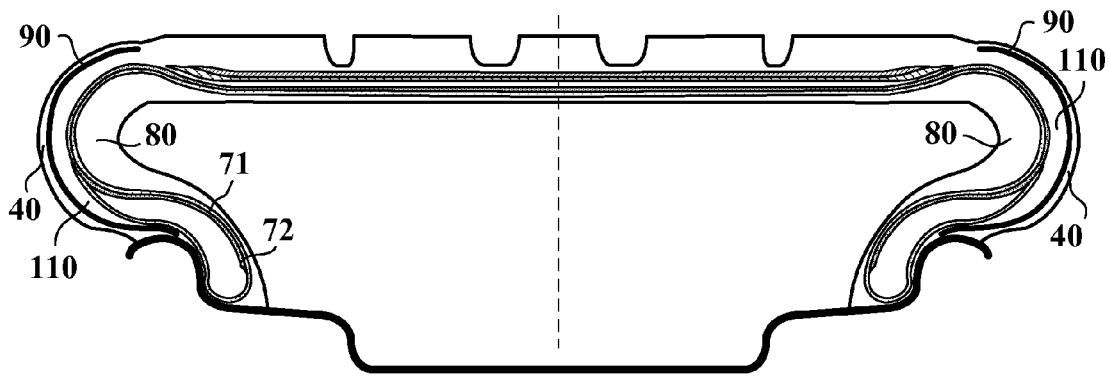

Under run-flat conditions (see FIG. 9), the additional sidewall reinforcement 90 is under tension, particularly as a result of the greater curvature of the sidewall 40 of the tire 11, due to the greater deflection, and because the additional sidewall reinforcement 90 is positioned axially on the outside.

Figure 10:
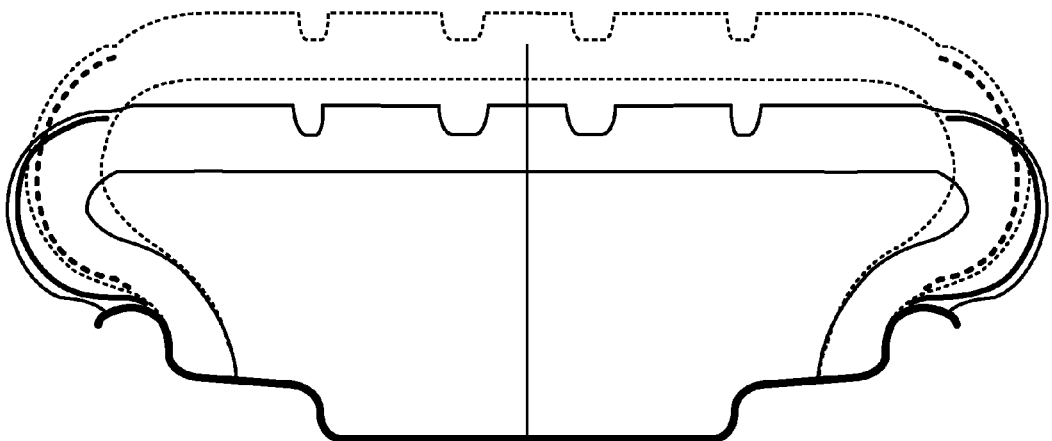

FIG. 10 provides a visual comparison between the condition of the additional sidewall reinforcement 90 under normal running conditions (dashed line) and under run-flat conditions (solid line).

Under run-flat conditions, the additional sidewall reinforcement 90 plays a part in the rigidity of the tire. The performance of the tire according to the invention is then equivalent to that of a tire with a small thickness of sidewall insert 80 to which is added the layer 110 of polymer compound positioned between the additional sidewall reinforcement and the carcass reinforcement. Through a suitable choice of materials and of the relative thicknesses of the sidewall insert and of the layer of polymer compound positioned between the additional sidewall reinforcement and the carcass reinforcement (this choice being within the competence of those skilled in the art), the run-flat performance of the tire according to the invention can be made equivalent to that of a reference tire.

Figure 3:
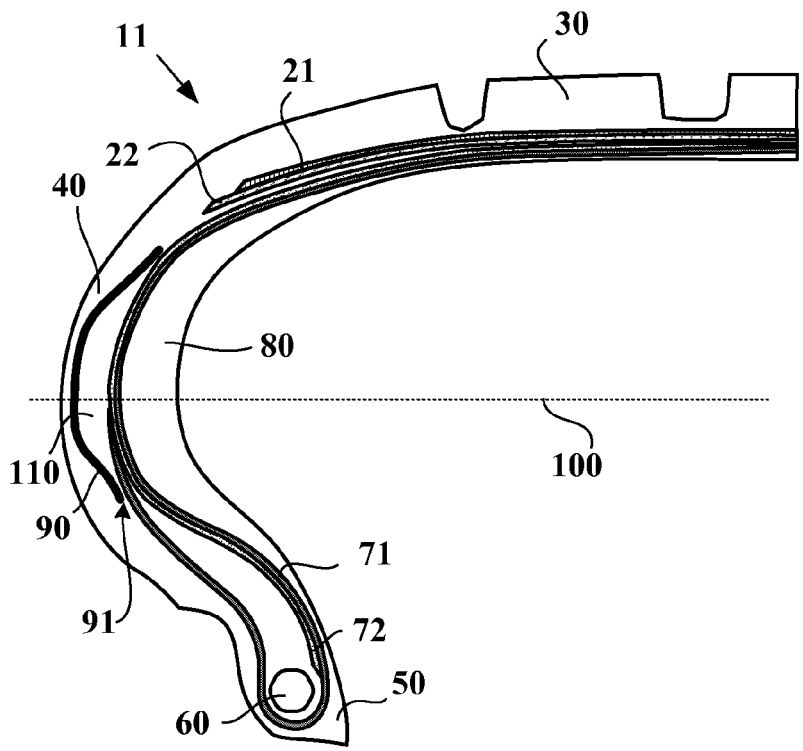
Figure 4:
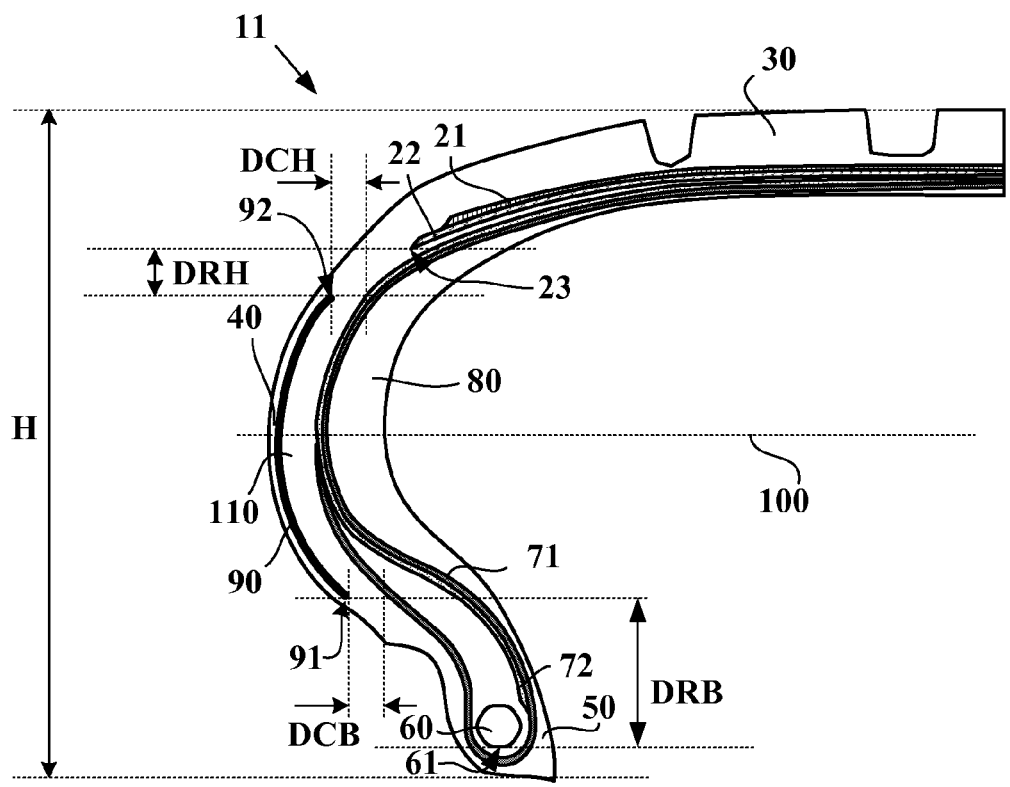

FIG. 5 depicts a tire according to another embodiment of the invention. Unlike the tires in FIGS. 2 to 4 (FIGS. 3 and 4 are described below), the tire depicted has an additional sidewall reinforcement which extends from one sidewall to the other. In this instance, the additional sidewall reinforcement is inserted, in the crown, between the carcass reinforcement and the crown reinforcement. The architecture of the crown of the tire is then equivalent to that of a tire with three reinforcing plies, the operation of which is very similar to that of a crown with two reinforcing plies. Of course, it would be equally possible to provide an additional sidewall reinforcement passing between the two layers of reinforcing elements 21 and 22 of the crown reinforcement, or to place it radially on the outside thereof, as depicted in FIG. 6.

If the tire is provided with a hoop reinforcement, it may be advantageous to provide an additional sidewall reinforcement passing radially on the outside of this hoop. This embodiment is depicted in FIG. 7. The tire 11 has a crown reinforcement formed of two layers of reinforcing elements 21 and 22; it is radially surmounted by a hoop reinforcement 120 formed of reinforcing elements 121 directed circumferentially and wound into a spiral as is well known to those skilled in the art and described, for example in document U.S. Pat. No. 6,533, 012. The additional sidewall reinforcement 90 extends, in the crown, radially on the outside of the hoop reinforcement 120.

It may, however, be advantageous, even if only for weight reasons, for each sidewall to be provided with its own separate additional sidewall reinforcement and for the additional sidewall reinforcement not to be extended into the crown, as is the case with the tire in FIG. 8. In this configuration, it is preferable to make provision for the radially outside end 92 of each additional sidewall reinforcement to lie either axially on the outside or axially on the inside of the adjacent axial end of the crown reinforcement, and preferably an axial distance DA of at least 5 mm away, to avoid any contact resulting from laying tolerances and, more generally, any concentration of stresses in a small area which may give rise to endurance problems.

In order to minimize the rigidity of the additional reinforcement when running under inflated conditions, it is advantageous to ensure that the additional reinforcement is axially on the outside of the crown reinforcements with a radial separation between the radially outside end of the additional reinforcement and that of the crown block. As a preference, when the tire 11 is mounted on a rim, the radial distance DRH between the radially outside end 92 of each additional sidewall reinforcement 90 and the axial end 23 of the axially outermost crown reinforcement is greater than 6 mm. These parameters are illustrated in FIG. 4.

It is also preferable to keep the radially inside end 91 of each additional sidewall reinforcement 90 away from the bead 50. As a preference, the radial distance DRB between the radially inside end 91 of each additional sidewall reinforcement 90 and the radially innermost point 61 of the corresponding annular reinforcing structure 60 is greater than or equal to 20 mm (see FIG. 4). This then avoids introducing the radially inside end 91 of the additional sidewall reinforcement 90 into the region of the tire that is wedged between the annular reinforcing structure 60 of the bead 50 and the flange of the rim (not depicted in FIG. 4) on which the tire is mounted. This is all the more important when the tire comprises a carcass reinforcement turned up around the annular reinforcing structure and in which the turn-up is also housed between the annular reinforcing structure and the rim flange. As the additional sidewall reinforcement does not enter this delicate region, the endurance of the relevant bead is improved.

It should be noted that if there are several points that qualify as radially innermost point of the annular reinforcing structure, then any one of these points may be considered when determining the radial heights.

As far as the axial distances DCH and DCB (see FIG. 4) between the radial ends 91 and 92 of the additional sidewall reinforcement 90 and the carcass reinforcement are concerned, there are two possible approaches. Either these radial ends are brought in close to the carcass ply, DCH and/or DCB being less than 2 mm, or they are kept as far away therefrom as possible.

FIG. 3 depicts a tire 11 in which the axial distances DCH and DCB are both shorter than 2 mm. This embodiment has the advantage that the layer 110 of polymer compound is entirely enclosed between the additional sidewall reinforcement 90 and the carcass reinforcement formed by the layers 71 and 72. If stress is applied to this incompressible layer 110, it offers great resistance to deformation and thus stiffens the sidewall under run-flat conditions.

FIG. 4 depicts a tire 11 of height H for which the axial distances DOH and DCB have been maximized in order to keep the radial ends 91 and 92 of the additional sidewall reinforcement 90 as far away as possible from the carcass reinforcement formed by the layers 71 and 72. In this instance, DCH and DCB measure 7 mm. This embodiment is advantageous in so far as it reduces the risk of the additional sidewall reinforcement 90 absorbing the tension exerted on the carcass reinforcement when the tire 11 is inflated to its service pressure. Of course, this advantage is obtained at the expense of enclosing the layer 110 of polymer compound: when the tire is running under run-flat conditions and stress is applied to the layer 110, the latter might be able to deform toward the remaining opening between the radial ends 91 and 92 of the additional sidewall reinforcement 90 and the carcass reinforcement.

FIG. 2 shows an intermediate embodiment in which DCB (see FIG. 4) is less than 2 mm and DCH (see FIG. 4) is equal to 8 mm.

The layer 110 of polymer compound positioned between the additional sidewall reinforcement 90 and the carcass reinforcement will in general have a crescent-shaped radial cross section. As a preference, its maximum axial thickness EC is greater than or equal to 10% of the maximum axial thickness E of the sidewall of the tire in the radial region over which the additional sidewall reinforcement extends. These values are illustrated in FIG. 2. In any event, and irrespective of the size of the tire, it is preferable to ensure that the maximum axial thickness EC of the layer 110 of polymer compound positioned between the additional sidewall reinforcement 90 and the carcass reinforcement is greater than or equal to 2 mm. Below this value, the stiffening effect when the additional sidewall reinforcement is tensioned is relatively small.

As a preference, the composition of the polymer compound positioned between the additional sidewall reinforcement and the carcass reinforcement is identical to the composition of the polymer compound of the sidewall insert. This choice also makes it possible to reduce the number of polymer compounds used to manufacture the tire, and, therefore, the cost of manufacture. Document WO 02/096677 gives several examples of rubber compounds that can be used.

The reinforcing elements of the additional sidewall reinforcement 90 may be filamentary elements. They may be made of rayon, aramid, aramid/nylon hybrid (in order to benefit from the bi-modulus nature of the cable: low modulus at slight deformation ("normal running"), high modulus at more substantial deformation ("run-flat running")), polyester, metal, etc. With a view to reducing the complexity of manufacture, the additional sidewall reinforcement may be made of the same materials as the carcass reinforcement.

For reasons of simplicity, all the figures depict tires 11, the carcass reinforcements of which are wound around a bead wire. This is not, however, a restrictive feature of the invention. The invention may be implemented irrespective of how the carcass reinforcement is anchored in the bead. It may, in particular, be incorporated into a run-flat tire in which the carcass reinforcement is wedged between two or more stacks of annular reinforcing elements.

Table 1 shows results obtained by numerical simulation for a 240/50 R 18 100 Y sized tire and a load equal to 80% of the load rating of the tire. A tire of the design of FIG. 2 was compared with a tire of the prior art as depicted in FIG. 1. The calculations related to tires with radial carcass reinforcements made of rayon. The additional sidewall reinforcement in the tires according to embodiments of the invention comprised radial threads made of rayon. The same material (modulus of 6 MPa at 10% elongation) was chosen for the sidewall inserts and for the layer of polymer compound positioned between the additional sidewall reinforcement and the carcass reinforcement.

TABLE 1

|  | Vertical stiffness [daN] at a pressure of 2.5 bar | Rolling resistance [kg/t] at a pressure of 2.5 bar | Max. temperature in the sidewall insert at 100 km/h [° C.] at a pressure of 0 bar |
|---|---|---|---|
| Tire of the prior art | 38.5 | 7.4 | 136.4 |
| Tire according to the invention | 36.4 | 7.2 | 136.7 |
| Difference | −5.5% | −2.5% | 0.4 |

A significant improvement in terms of vertical stiffness (which is connected with the ride comfort experienced by the user) and in terms of rolling resistance under normal running conditions can be observed, the run-flat autonomy (i.e. the distance that can be covered in run-flat mode before the tire is destroyed), as evaluated using the maximum temperature in the sidewall insert, remaining practically unchanged.

The invention claimed is:

1. A run-flat tire comprising:
   a crown comprising a crown reinforcement surmounted by a tread;
   two sidewalls extending the crown radially inward;
   two beads radially inward to the sidewalls and each comprising an annular reinforcing structure;
   at least one carcass reinforcement anchored in each of the beads and extending from the beads through the sidewalls toward the crown; and
   at least one sidewall insert axially on the inside of the carcass reinforcement, comprising at least one polymer compound;
   wherein at least one sidewall of the tire further comprises:
   (i) at least one additional sidewall reinforcement having radial ends and comprising radial reinforcing elements, positioned axially on the outside of the carcass reinforcement, a radially inside end of said radial ends of the at least one additional sidewall reinforcement being, in any radial section, radially on the inside of an axial straight line that passes through those points in the sidewalls at which the carcass reinforcement has its greatest axial width when the tire is mounted on a rim; and
   (ii) a layer of polymer compound positioned between said at least one additional sidewall reinforcement and the carcass reinforcement, over at least a portion of the additional sidewall reinforcement,
   wherein a radially outside end of the additional sidewall reinforcement is axially on the outside of an adjacent axial end of the crown reinforcement,
   wherein a maximum axial thickness of the layer of polymer compound positioned between said at least one additional sidewall reinforcement and the carcass reinforcement is greater than or equal to 10% of a maximum axial thickness of the sidewall of the tire in a radial region over which said at least one additional sidewall reinforcement extends,
   wherein an axial distance between at least one of the radial ends of said at least one additional sidewall reinforcement and the carcass reinforcement is less than 2 mm, and
   wherein the maximum axial thickness of the layer of polymer compound positioned between said at least one additional sidewall reinforcement and the carcass reinforcement is greater than or equal to 2 mm.

2. The tire according to claim 1, wherein said at least one additional sidewall reinforcement consists of two separate portions, said portions being positioned in different sidewalls.

3. The tire according to claim 1, wherein a radial distance between the radially outside end of each said portion of the additional sidewall reinforcement and the axial ends of the crown reinforcement is greater than 6 mm.

4. The tire according to claim 1, wherein a radial distance between the radially inside end of said at least one additional sidewall reinforcement and a radially innermost point of the corresponding annular reinforcing structure is greater than or equal to 20 mm.

5. The tire according to claim 1, wherein an axial distance between at least two radial ends of said at least one additional sidewall reinforcement and the carcass reinforcement is less than 2 mm.

6. The tire according to claim 1, wherein the composition of the polymer compound positioned between said at least one additional sidewall reinforcement and the carcass reinforcement is identical to the composition of the polymer compound of the sidewall insert.

* * * * *